(12) United States Patent
Meitav et al.

(10) Patent No.: US 11,128,843 B2
(45) Date of Patent: Sep. 21, 2021

(54) IMAGE-SENSOR DATA COMPRESSION

(71) Applicant: Facebook Technologies, LLC, Menlo Park, CA (US)

(72) Inventors: Ohad Meitav, Sunnyvale, CA (US); David Vakrat, Sunnyvale, CA (US); Vlad Fruchter, Los Altos, CA (US); Andrey Tovchigrechko, Saratoga, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/741,633

(22) Filed: Jan. 13, 2020

(65) Prior Publication Data

US 2021/0218936 A1 Jul. 15, 2021

(51) Int. Cl.
*H04N 9/04* (2006.01)
*H04N 5/232* (2006.01)
*H04N 5/217* (2011.01)

(52) U.S. Cl.
CPC ....... *H04N 9/04551* (2018.08); *H04N 5/2173* (2013.01); *H04N 5/23229* (2013.01); *H04N 9/04515* (2018.08)

(58) Field of Classification Search
CPC ........... H04N 9/04551; H04N 5/23229; H04N 5/2173; H04N 9/04515
See application file for complete search history.

(56) References Cited

U.S. PATENT DOCUMENTS

| | | | | |
|---|---|---|---|---|
| 2003/0048369 A1* | 3/2003 | Guarnera | ........... | H04N 9/04557 348/273 |
| 2015/0319444 A1* | 11/2015 | Ando | ........... | H04N 19/176 375/240.12 |
| 2016/0323555 A1* | 11/2016 | Suzuki | ........... | H04N 5/2252 |
| 2019/0289171 A1* | 9/2019 | Kenjo | ........... | H04N 5/341 |

OTHER PUBLICATIONS

Doutre, et al., H.264-Based Compression of Bayer Pattern Video Sequences, IEEE Transactions on Circuits and Systems for Video Technology, 18(6):725-734, Jun. 2008.

* cited by examiner

*Primary Examiner* — Gevell V Selby
(74) *Attorney, Agent, or Firm* — Baker Botts L.L.P.

(57) ABSTRACT

In one embodiment, a method includes accessing image-sensor data generated by the image sensor, where the image sensor has a color filter array with a pre-determined number of filter sets, and where each set of filters has a single color, splitting the image-sensor data into a pre-determined number of images, where each image corresponds to a portion of the image-sensor data associated with one of the sets of filters, compressing each of the images using an image compression algorithm, and sending the compressed images to a second computing device, where the second computing device is configured to create an output image based on the compressed images.

18 Claims, 8 Drawing Sheets

IMAGE-SENSOR DATA COMPRESSION

TECHNICAL FIELD

This disclosure generally relates to artificial reality systems, and in particular, related to compressing image-sensor data efficiently in artificial reality systems.

BACKGROUND

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

In particular embodiments, a first computing device may send a plurality of separated compressed color planes for an image to a second computing device so that the second computing device can reconstruct the image by processing the decompressed color planes. An artificial-reality system may have an HMD with limited computing power and a separate host computing system. The first computing device may be the HMD in the artificial reality system. The second computing device may be the host computing device in the artificial reality system. The HMD may have external-facing cameras that capture the environment of the user. The image sensor along with Bayer filters may be configured to only capture light of particular wavelengths at each pixel. For example, a red filter is applied to a first pixel so that only red light is recorded for the first pixel, a green filter is applied to a second pixel so that only green light is recorded for the second pixel, and a blue filter is applied to a third pixel so that only blue light is recorded for the third pixel. As a result, the raw sensor data form a mosaic pattern (e.g., Bayer pattern). The captured image data may need to undergo a de-mosaic process in order for each pixel to have proper RGB information. The de-mosaic process may be computationally expensive. Due to the limited power of the HMD, performing the de-mosaic process at the host computing device may be preferred over performing the de-mosaic process at the HMD. A high-resolution raw image may need to be compressed to reduce a transmission latency in a way that allows the host computing device to recreate the image. However, a Bayer image may not be compressed well because neighboring pixels in the Bayer image have different colors. For example, a green pixel may be next to two red and two blue pixels. The compression algorithms used for an image compression assume neighboring pixels have similar color values. Thus, A Bayer image may not be suitable to be compressed by any of those compression algorithms. The HMD may divide the Bayer image's color information into four separate images, where each image comprises information associated with a single color, compress each image separately, and transmit the compressed images to the host computing system. On receiving the compressed four images, the host computing device may de-compress the images and recreate the Bayer image by interleaving the de-compressed images. Then, the host computing device may perform a de-mosaic process on the recreated Bayer image.

In particular embodiments, a first computing device may be associated with an image sensor. The first computing device may access image-sensor data generated by the image sensor. The image sensor may have a color filter array with a pre-determined number of filter sets. Each set of filters may have a single color. The image sensor may convert light information for the image into electrical data for each pixel. A filter of the color filter array may pass light information for a corresponding color. Each pixel in the image sensor may be associated with a filter. The filter sets in the color filter array may be arranged in a pre-determined pattern. The color filter array may be a Bayer filter array. The first computing device may split the image-sensor data into a pre-determined number of images. Each image may correspond to a portion of the image-sensor data associated with one of the sets of filters. Each image may comprise data associated with pixels filtered by filters of a corresponding filter set. The pre-determined number of images may be equal to the pre-determined number of filter sets. The first computing device may compress each of the images using an image compression algorithm. The image compression algorithm may be efficient with sparse data. The first computing device may send the compressed images to a second computing device. In particular embodiments, the second computing device may be configured to create an output image based on the compressed images. In order to create the output image, the second computing device may de-compress each of the received compressed images. The second computing device may generate an interleaved image data by interleaving the de-compressed images. The second computing device may generate the output image by de-mosaicing the interleaved image data. The second computing device may perform noise reduction, dynamic range correction, or interpolation to generate the output image.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
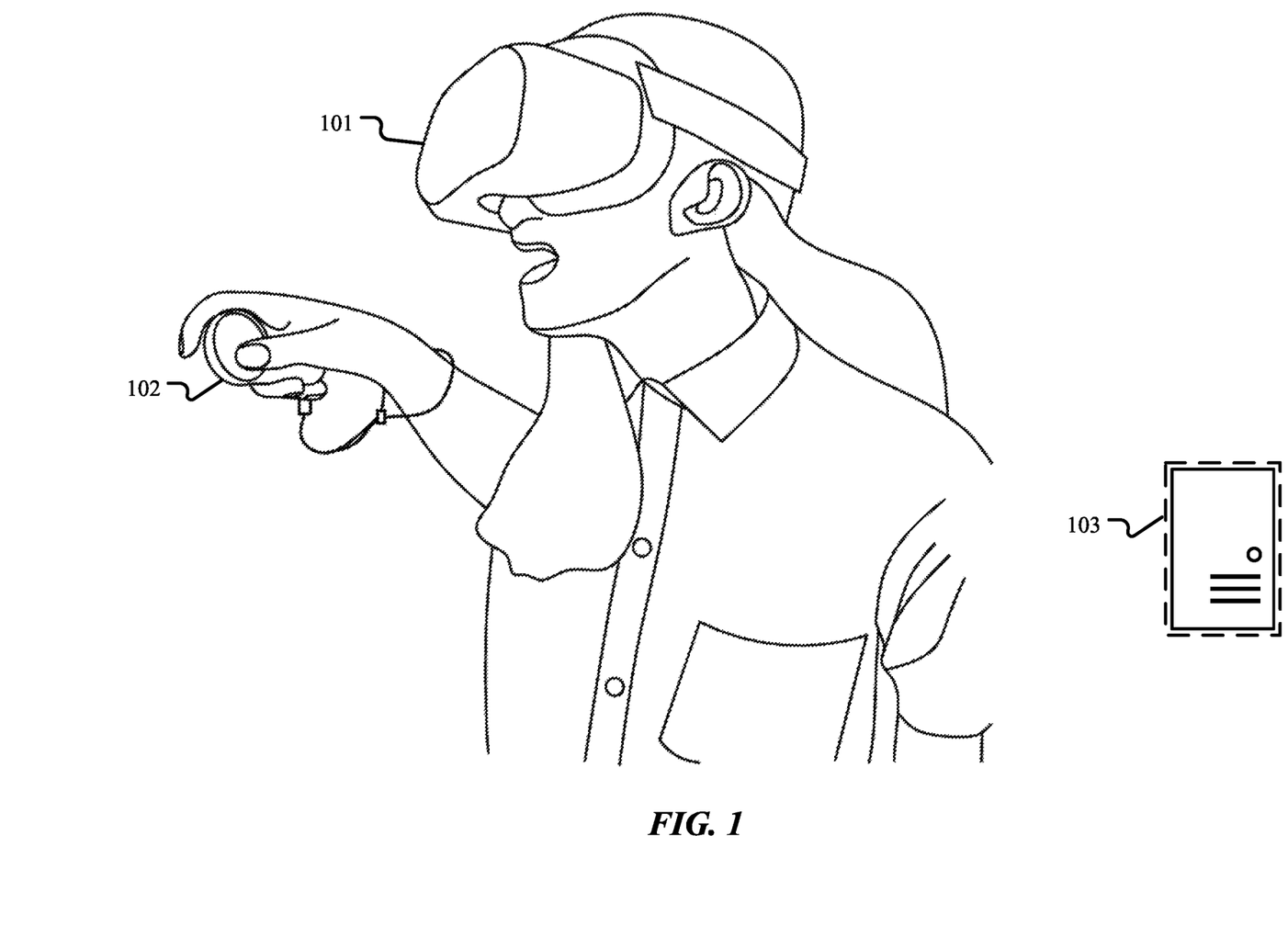
FIG. 1 illustrates an example artificial reality system.

FIG. 1 illustrates an example artificial reality system. Artificial reality is a form of reality that has been adjusted in some manner before presentation to a user 105, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The example artificial reality system illustrated in FIG. 1 may comprise a head-mounted display (HMD) 101, a controller 102, and a host computing device 103. A user 105 may wear a head-mounted display (HMD) 101 that may provide visual artificial reality content to the user 105. The HMD 101 may include an audio device that may provide audio artificial reality content to the user 105. A controller 102 may comprise a trackpad and one or more buttons. The controller 102 may receive input from the user 105 and relay the input to the host computing device 103. The controller 102 may also provide haptic feedback to the user 105. The host computing device 103 may be connected to the HMD 101 and the controller 102. The host computing device 103 may control the HMD 101 and the controller 102 to provide the artificial reality content to the user and receive input from the user 105. The host computing device 103 may be a standalone host computer system, combined with the HMD 101, a mobile device, or any other hardware platform capable of providing artificial reality content to one or more users 105 and receive input from the users 105.

In particular embodiments, a first computing device may send a plurality of separated compressed color planes for an image to a second computing device so that the second computing device can reconstruct the image by processing the decompressed color planes. An artificial reality system may have an HMD 101 with limited computing power and a separate host computing device 103. The first computing device may be the HMD 101 in the artificial reality system. The second computing device may be the host computing device 103 in the artificial reality system. The HMD 101 may have external-facing cameras that capture the environment of the user. The image sensor along with Bayer filters may be configured to only capture light of particular wavelengths at each pixel. For example, a red filter is applied to a first pixel so that only red light is recorded for the first pixel, a green filter is applied to a second pixel so that only green light is recorded for the second pixel, and a blue filter is applied to a third pixel so that only blue light is recorded for the third pixel. As a result, the raw sensor data form a mosaic pattern (e.g., Bayer pattern). The captured image data may need to undergo a de-mosaic process in order for each pixel to have proper RGB information. The de-mosaic process may be computationally expensive. Due to the limited power of the HMD 101, performing the de-mosaic process at the host computing device 103 may be preferred over performing the de-mosaic process at the HMD 101. A high-resolution raw image may need to be compressed to reduce a transmission latency in a way that allows the host computing device 103 to recreate the image. However, a Bayer image may not be compressed well because neighboring pixels in the Bayer image have different colors. For example, a green pixel may be next to two red and two blue pixels. The compression algorithms used for an image compression assume neighboring pixels have similar color values. Thus, a Bayer image may not be suitable to be compressed by any of those compression algorithms. The HMD 101 may divide the Bayer image's color information into four separate images, where each image comprises information associated with a single color, compress each image separately, and transmit the compressed images to the host computing system 103. On receiving the compressed four images, the host computing device 103 may de-compress the images and recreate the Bayer image by interleaving the de-compressed images. Then, the host computing device 103 may perform a de-mosaic process on the recreated Bayer image.

In particular embodiments, a first computing device may be associated with an image sensor. The first computing device may access image-sensor data generated by the image sensor. The image sensor may have a color filter array with a pre-determined number of filter sets. Each set of filters may have a single color. The image sensor may convert light information for the image into electrical data for each pixel. A filter of the color filter array may pass light information for a corresponding color. Each pixel in the image sensor may be associated with a filter. The filter sets in the color filter array may be arranged in a pre-determined pattern. The color filter array may be a Bayer filter array. The first computing device may split the image-sensor data into a pre-determined number of images. Each image may correspond to a portion of the image-sensor data associated with one of the sets of filters. Each image may comprise data associated with pixels filtered by filters of a corresponding filter set. The pre-determined number of images may be equal to the pre-determined number of filter sets. The first computing device may compress each of the images using an image compression algorithm. The image compression algorithm may be efficient with sparse data. The first computing device may send the compressed images to a second computing device. In particular embodiments, the second computing device may be configured to create an output image based on the compressed images. In order to create the output image, the second computing device may de-compress each of the received compressed images. The second computing device may generate an interleaved image data by interleaving the de-compressed images. The second computing device may generate the output image by de-mosaicing the interleaved image data. The second computing device may perform noise reduction, dynamic range correction, or interpolation to generate the output image. Although this disclosure describes compressing image-sensor data in a particular manner, this disclosure contemplates compressing image-sensor data in any suitable manner.

Figure 2:
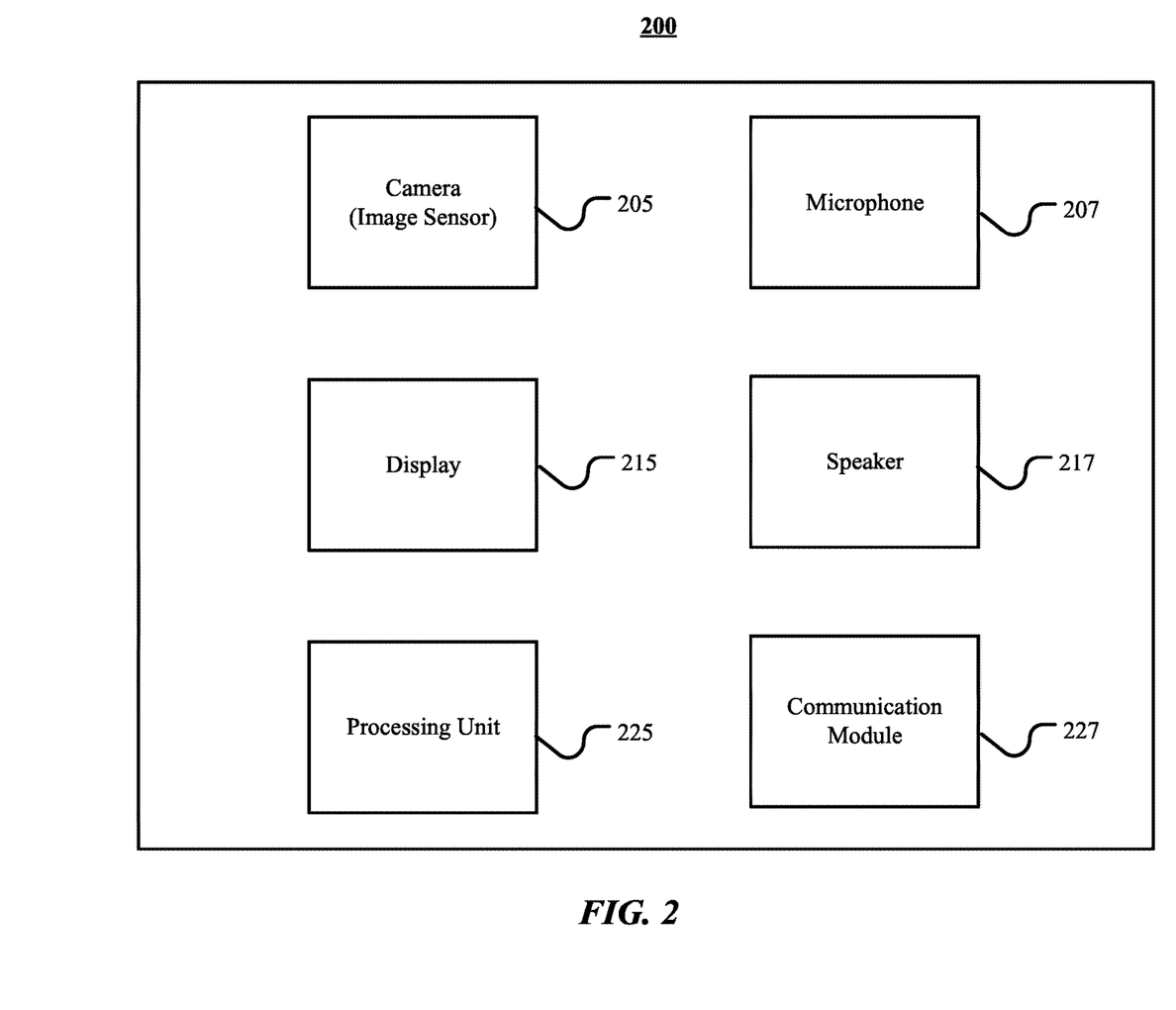
FIG. 2 illustrates an example logical architecture of an HMD.

FIG. 2 illustrates an example logical architecture 200 of an HMD 101. One or more external-facing cameras 205 may comprise one or more image sensors. The external-facing cameras 205 may capture the environment of the user. A microphone 207 may capture audio input from the user or from the environment. The captured image-sensor data or audio data may be processed by the processing unit 225 before being sent to the host computing device 103 through the communication module 227. The host computing device 103 may create artificial reality content. The artificial reality content may include completely generated content or generated content combined with captured visual and/or audio data. The artificial reality content may be transferred from the host computing device 103 to the HMD 101 through the communication module 227. The artificial reality content may be processed by the processing unit 225 before being presented to the user via a display 215 and/or a speaker 217. Although this disclosure describes a particular logical architecture of an HMD, this disclosure contemplates any suitable architecture of an HMD.

In particular embodiments, a first computing device may be associated with an image sensor. The first computing device may access image-sensor data generated by the image sensor. The first computing device may be an HMD 101. As an example and not by way of limitation, the HMD 101 may be associated with one or more external-facing cameras 205 that comprise one or more image sensors. When the one or more external-facing cameras 205 capture the environment of the user, the HMD may access raw image-sensor data generated by the one or more image sensors. The raw image-sensor data may be transferred from the one or more image sensors of the one or more cameras 205 to the processing unit 225 through a bus, or through any suitable data transmission medium. Although this disclosure describes accessing image-sensor data in a particular manner, this disclosure contemplates accessing image-sensor data in any suitable manner.

Figure 3:
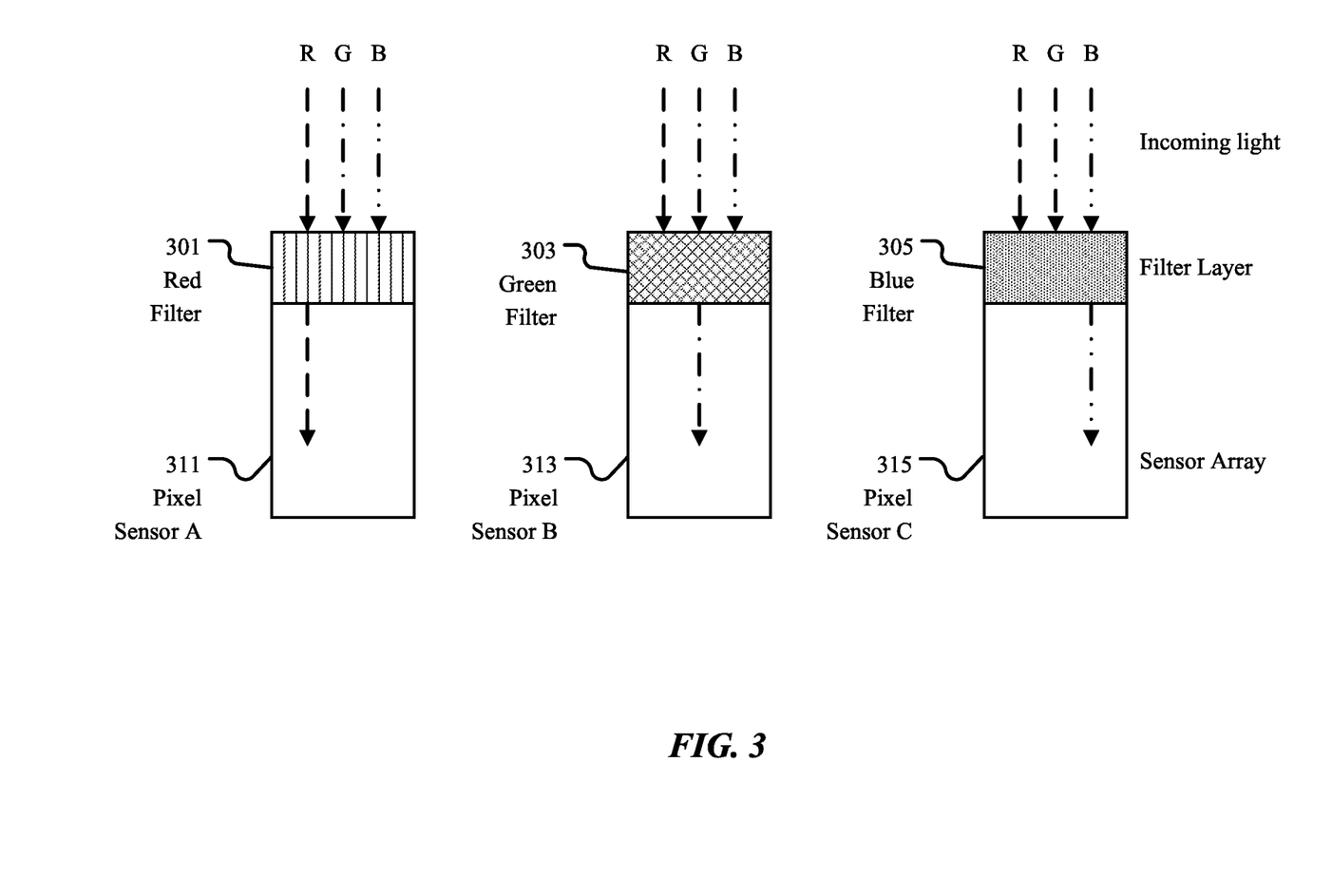
FIG. 3 illustrates an example image sensor associated with a color filter array.

The image sensor may convert light information for the image into electrical data for each pixel. The image sensor may have a color filter array with a pre-determined number of filter sets. Each filter set may have a single color. A filter of the color filter array may pass light information for a corresponding color. Each pixel in the image sensor may be associated with a filter. FIG. 3 illustrates an example image sensor associated with a color filter array. As an example and not by way of limitation, illustrated in FIG. 3, the image sensor comprises a plurality of pixel sensors. FIG. 3 illustrates only three pixel sensors 311, 313, and 315 for a sake of brevity. The image sensor is associated with a color filter array comprising with a pre-determined number of filter sets. Each filter set have a single color. Each filter belongs to one of the filter sets and passes light information for only corresponding color. Each filter is associated with a pixel sensor in the image sensor. In the example illustrated in FIG. 3, a red filter 301 is associated with pixel sensor A 311. As the red filter 301 passes light information only for red, captured data at pixel sensor A 311 may be associated with only red light. The green filter 303 is associated with pixel sensor B 313. As the green filter 303 passes light information only for green, captured data at pixel sensor B 313 may be associated with only green light. The blue filter 305 is associated with pixel sensor C 315. As the blue filter 305 passes light information only for blue, captured data at pixel sensor C 315 may be associated with only blue light. may capture Although this disclosure describes a particular image sensor associated with a color filter array, this disclosure contemplates any suitable image sensor associated with a color filter array.

Figure 4:
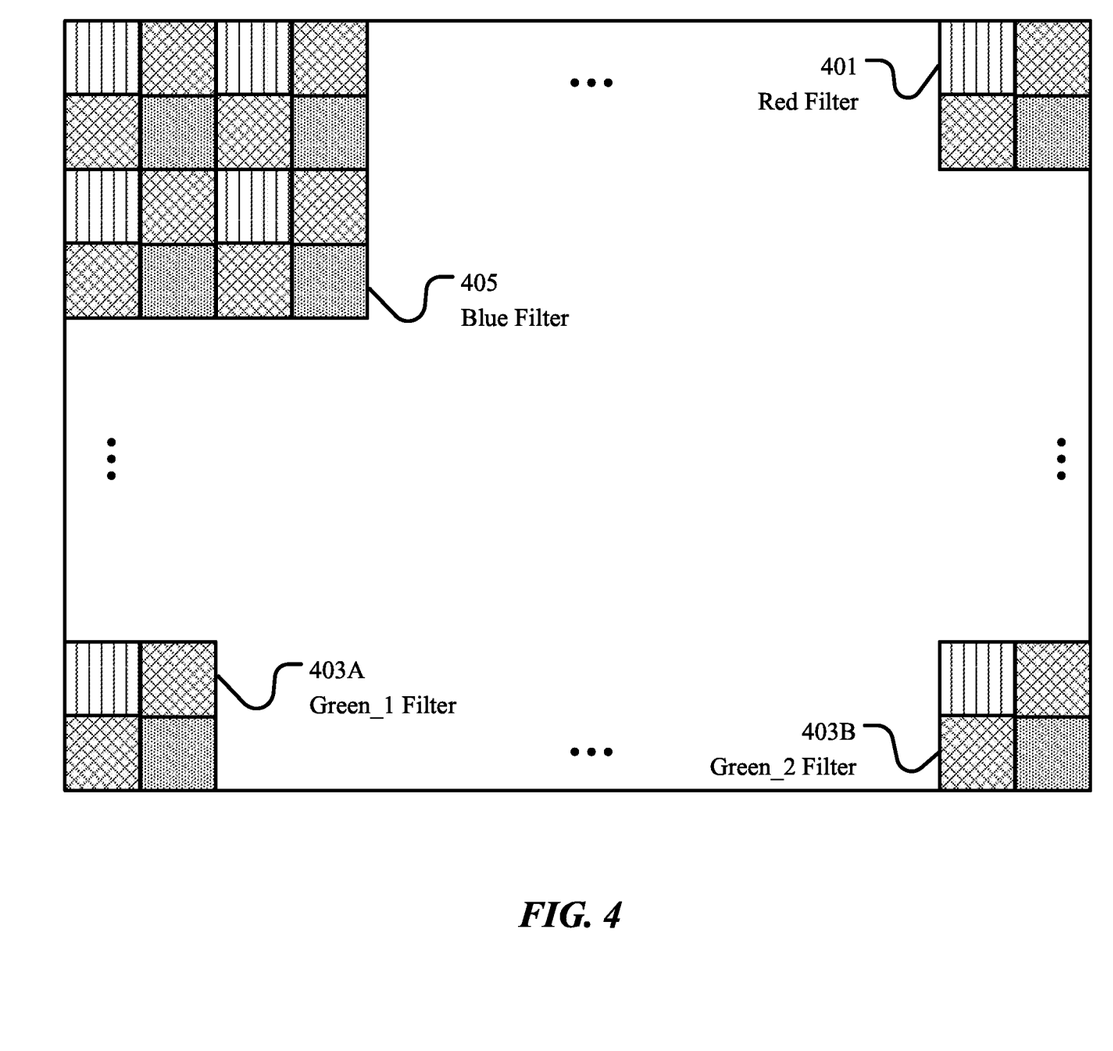
FIG. 4 illustrates an example Bayer filter array pattern.

In particular embodiments, the color filter array may be a Bayer filter array. The filter sets in the color filter array may be arranged in a pre-determined pattern. FIG. 4 illustrates an example Bayer filter array pattern. As an example and not by way of limitation, illustrated in FIG. 4, a quarter of the total number of filters are red filters 401. Another quarter of the total number of filters are blue filters 405. A half of the total number of filters are green filters 403A and 403B. The pattern may be a repeating 2×2 arrangement. When the associated image sensor is read out line by line, a sequence of a first line may come out RGRGRG. The alternative line sequence may be GBGBGB. Although this disclosure describes a particular pattern for a color filter array, this disclosure contemplates any suitable pattern for a color filter array.

Figure 5:
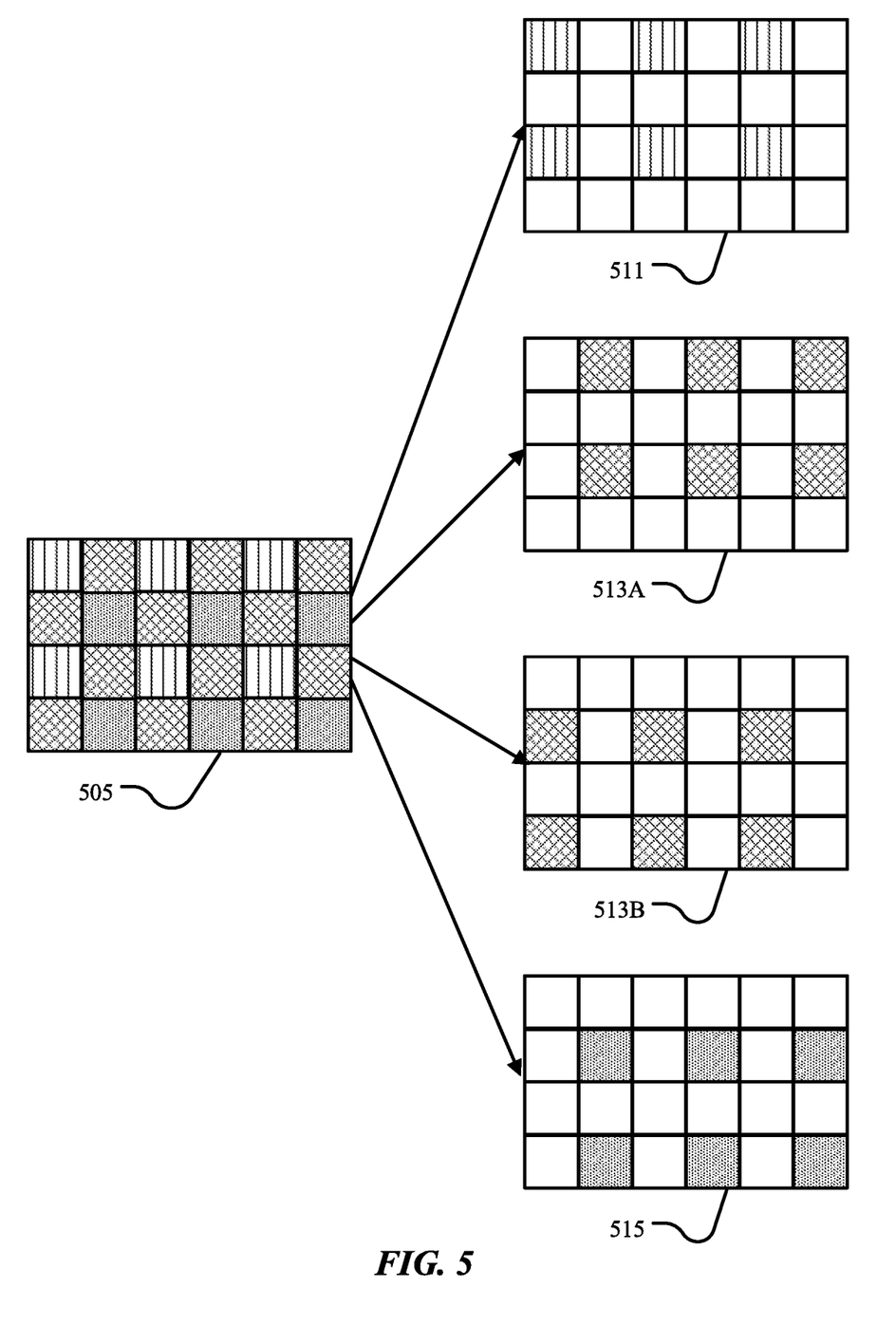
FIG. 5 illustrates an example splitting of the image-sensor data into a pre-determined number of images.

In particular embodiments, the first computing device may split the image-sensor data into a pre-determined number of images. Each image may correspond to a portion of the image-sensor data associated with one of the sets of filters. Each image may comprise data associated with pixels filtered by filters of a corresponding filter set. Thus, each image may be a sparse representation of a scene. Only one pixel out of the pre-determined number of pixels in an image may carry color information, while the other pixels do not carry any color information. The pre-determined number of images may be equal to the pre-determined number of filter sets. As an example and not by way of limitation, continuing with a prior example, the image-sensor data transferred to the processing unit 225 may form a mosaic pattern. The image-sensor data data may need to undergo a de-mosaic process in order for each pixel to have proper RGB information. The de-mosaic process may be computationally expensive. Due to the limited computing power of the processing unit 225, performing the de-mosaic process at the host computing device 103 may be preferred over performing the de-mosaic process at the HMD 101. The image-sensor data may need to be compressed to reduce a transmission latency in a way that allows the host computing device 103 to recreate the image-sensor data. However, the image-sensor data may not be compressed well because neighboring pixels in the image-sensor data have different colors. For example, a green pixel may be next to two red and two blue pixels. The compression algorithms used for an image compression assume neighboring pixels have similar color values. Thus, the image-sensor data may not be suitable to be compressed by any of those compression algorithms. For these reasons, the processing unit 225 of the HMD 101 may split the image-sensor data into a pre-determined number of images. FIG. 5 illustrates an example splitting of the image-sensor data into a pre-determined number of images. Each image may correspond to a portion of the image-sensor data 505 associated with one of the sets of filters. Each image may comprise data associated with a corresponding color. A first image 511 may comprise data from pixels associated with red filters 401. A second image 513A may comprise data from pixels associated with a first set of green filters 403A. A third image 513B may comprise data from pixels associated with a second set of green filters 403B. A fourth image 515 may comprise data from pixels associated with blue filters 405. Although this disclosure describes splitting the image-sensor data into a pre-determined number of images in a particular manner, this disclosure contemplates splitting the image-sensor data into a pre-determined number of images in any suitable manner.

In particular embodiments, the first computing device may perform a noise reduction on each of the images to improve the compression quality for a given bitrate. As an example and not by way of limitation, continuing with a prior example, the processing unit 225 may perform a noise reduction on each of the images. The noise reduction may help to improve the compression quality when the images are compressed. Although this disclosure describes performing a noise reduction before compressing images in a particular manner, this disclosure contemplates performing a noise reduction before compressing images in any suitable manner.

In particular embodiments, the first computing device may compress each of the images using an image compression algorithm. The image compression algorithm may be efficient with sparse data. As an example and not by way of limitation, continuing with a prior example, the processing unit 225 may compress each of the images 511, 513A, 513B, and 515 using an image compression algorithm. Examples of the image compression algorithms include, but not limited to, Joint Photographic Experts Group (JPEG) and Motion Picture Experts Group (MPEG). The image compression algorithm may be efficient with sparse data. Although this disclosure describes compressing each of the split image in a particular manner, this disclosure contemplates compressing each of the split image in any suitable manner.

In particular embodiments, the first computing device may compress the images together using an image compression algorithm. The images may be stacked together as the pre-determined number of channels in a single data stream. The image compression algorithm may be efficient with sparse data. As an example and not by way of limitation, continuing with a prior example, the processing unit 225 may compress the images 511, 513A, 513B and 515 into a single data stream using an image compression algorithm. Although this disclosure describes compressing the images in a particular manner, this disclosure contemplates compressing the images in any suitable manner.

In particular embodiments, the first computing device may send the compressed images to a second computing device. As an example and not by way of limitation, continuing with a prior example, the communication module 227 of the HMD 101 may send the compressed images to the host computing device 103. In particular embodiments, the HMD 101 and the host computing device 103 may be connected through one or more cables. The communication module 227 may utilize a suitable wired communication protocol (e.g., Universal Serial Bus (USB), etc.) to send the compressed images to the host computing device 103. In particular embodiments, the HMD 101 and the host computing device 103 may be connected through one or more wireless links. The communication module 227 may utilize a suitable wireless communication protocol (e.g., Wireless Local Area Network (WLAN), Bluetooth, etc.) to send the compressed images to the host computing device 103. Although this disclosure describes sending compressed images to a second computing device in a particular manner, this disclosure contemplates sending compressed images to a second computing device in any suitable manner.

In particular embodiments, the second computing device may be configured to create an output image based on the compressed images. In order to create the output image, the second computing device may de-compress each of the received compressed images. In case the images are compressed together, the second computing device may extract each of the images upon de-compressing the received compressed data. The second computing device may generate an interleaved image data by interleaving the de-compressed images. The second computing device may generate the output image by de-mosaicing the interleaved image data. The second computing device may perform interpolation, noise reduction, or dynamic range compression to generate the output image. As an example and not by way of limitation, continuing with a prior example, the host computing device 103 may de-compress the received images. The host computing device 103 may re-construct the image-sensor data by interleaving the de-compressed images. The host computing device 103 may create an output image by de-mosaicing the interleaved image data. A de-mosaicing algorithm is a digital image process used to reconstruct a full color image from an image-sensor data generated by an image sensor associated with a color filter array. A suitable de-mosaicing algorithm may be used for the de-mosaicing. Examples of the de-mosaicing algorithm include, but not limited to, Aliasing Minimization and Zipper Elimination (AMaZE), Ratio Corrected De-mosaicing (RCD), and Linear Minimum Mean Square-Error Estimation (LMMSE). Although this disclosure describes creating an output image in a particular manner, this disclosure contemplates creating an output image in any suitable manner.

Figure 6:
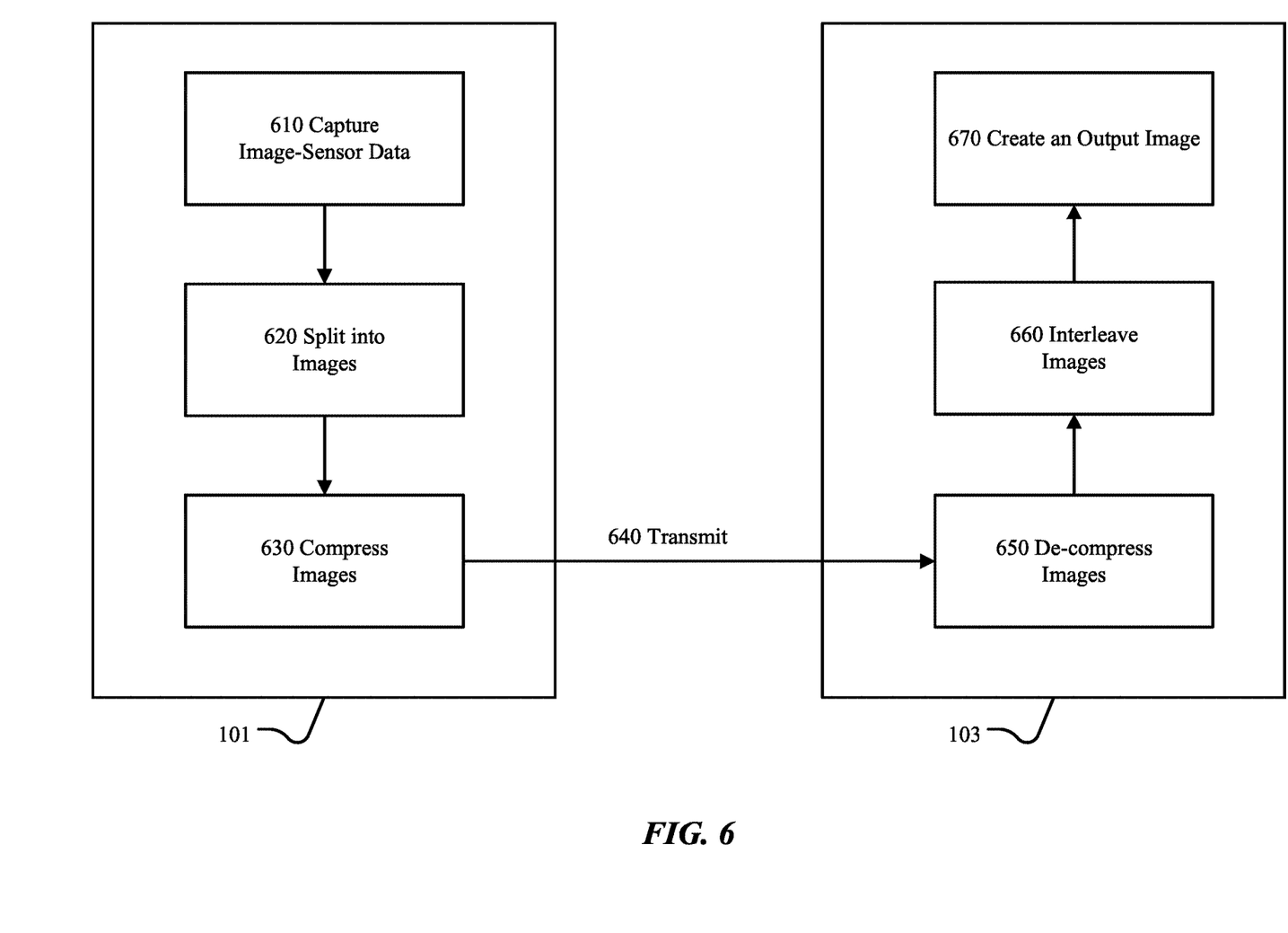
FIG. 6 illustrates an example flow for creating an output image based on image-sensor data.

FIG. 6 illustrates an example flow for creating an output image based on image-sensor data. At step 610, one or more image sensors associated with an HMD 101 may capture image-sensor data. At step 620, the processing unit 225 of the HMD 101 may split the image-sensor data into a pre-determined number of images. At step 630, the processing unit 225 of the HMD 101 may compress the split images. At step 640, the communication module 227 of the HMD may transmit the compressed images to the host computing device 103. At step 650, the host computing device 103 may de-compress the images. At step 660, the host computing device 103 may interleave images. At step 670, the host computing device 103 may create an output image by performing a de-mosaicing. Although this disclosure describes and illustrates particular components, devices, or systems carrying out particular steps of the flow of FIG. 6, this disclosure contemplates any suitable combination of any suitable components, devices, or systems carrying out any suitable steps of the flow of FIG. 6.

Figure 7:
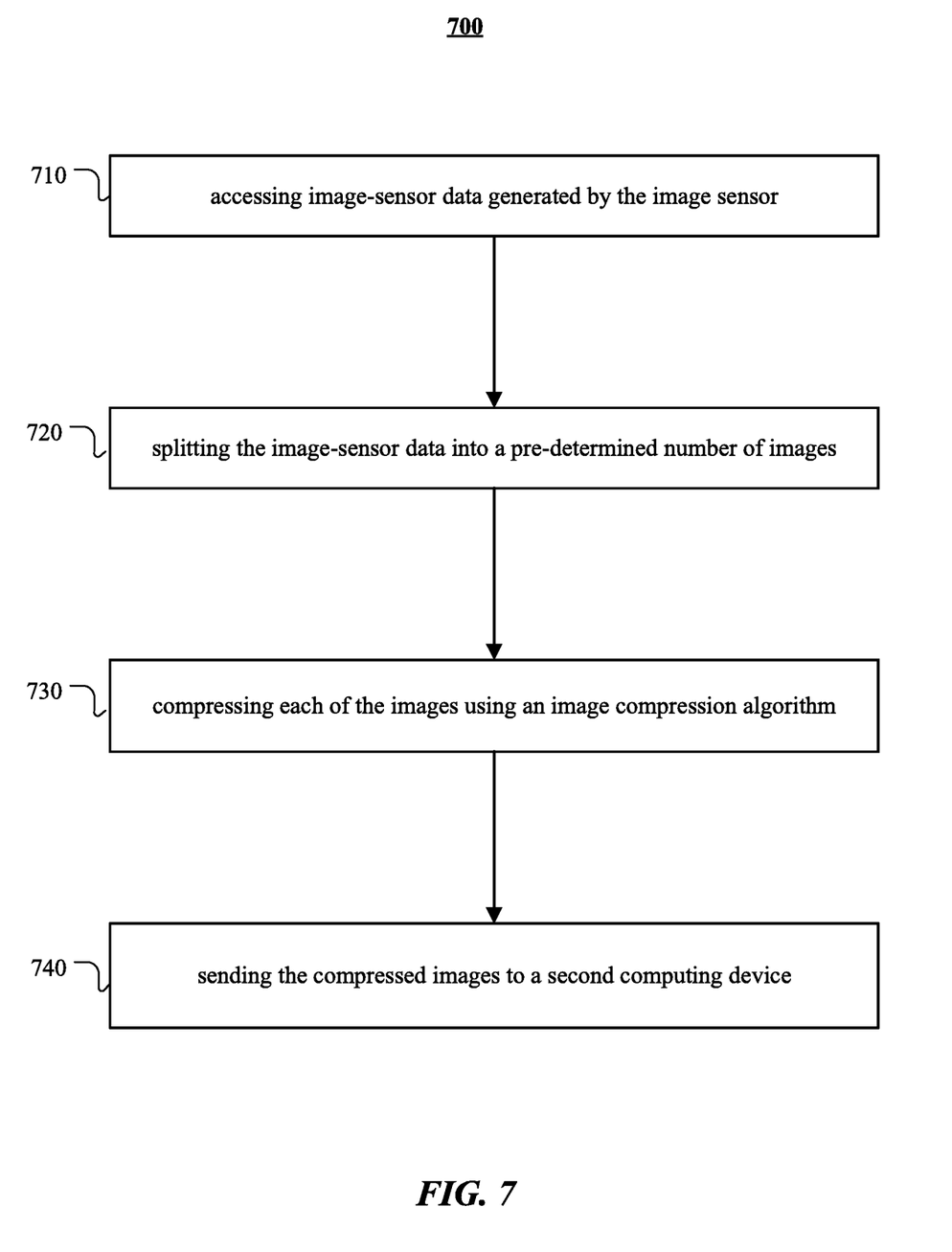
FIG. 7 illustrates an example method for compressing image-sensor data to improve transmission efficiency.

FIG. 7 illustrates an example method 700 for compressing image-sensor data to improve the transmission efficiency. The method may begin at step 710, where a first computing device may access image-sensor data generated by an image sensor associated with the first computing device. The image sensor may have a color filter array with a pre-determined number of filter sets. Each set of filters may have a single color. At step 720, the first computing device may split the image-sensor data into a pre-determined number of images. Each image may correspond to a portion of the image-sensor data associated with one of the sets of filters. At step 730, the first computing device may compress each of the images using an image compression algorithm. At step 740, the first computing device may send the compressed images to a second computing device. The second computing device may be configured to create an output image based on the compressed images. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for compressing image-sensor data to improve the transmission efficiency including the particular steps of the method of FIG. 7, this disclosure contemplates any suitable method for compressing image-sensor data to improve the transmission efficiency including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Systems and Methods

Figure 8:
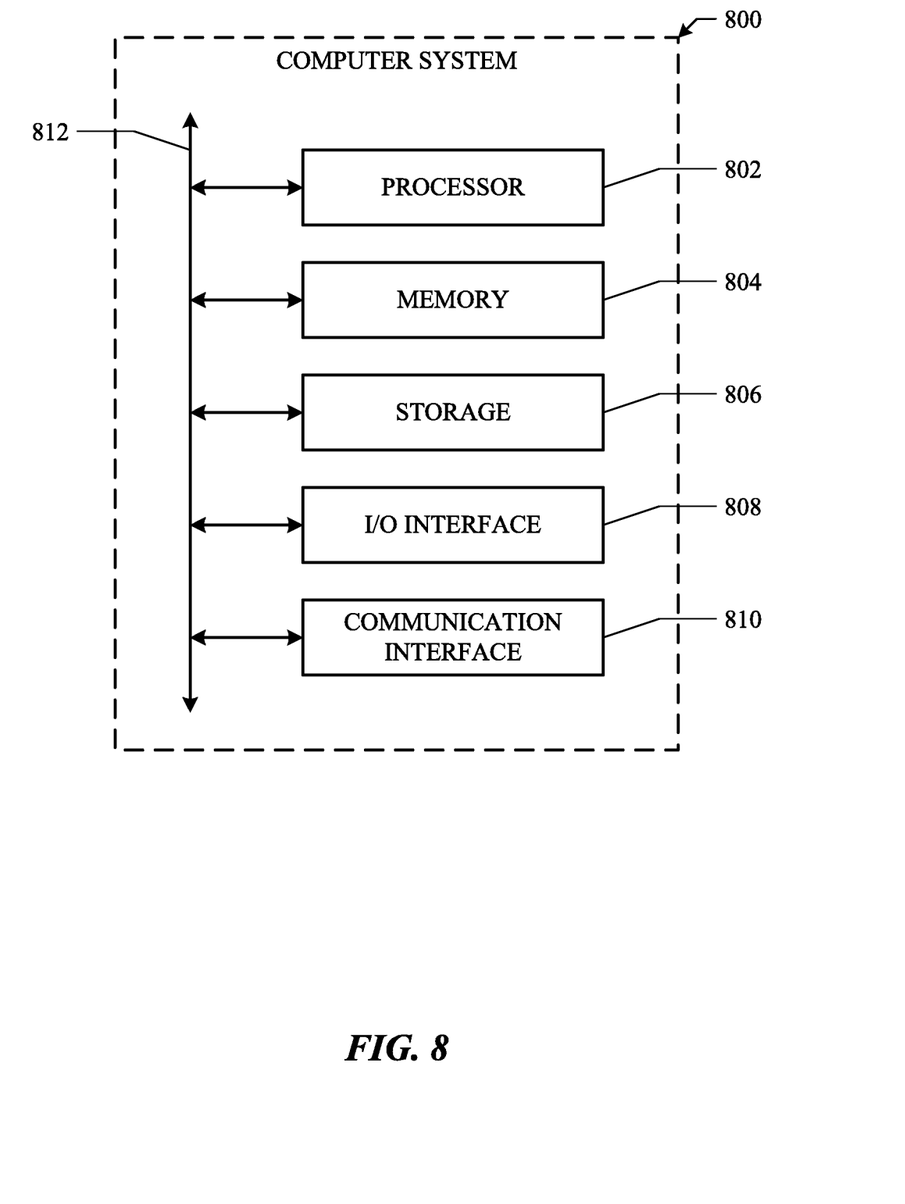
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising: by a first computing device associated with an image sensor:
    accessing image-sensor data generated by the image sensor, wherein the image sensor has a color filter array comprising a first pre-determined number of filter sets, and wherein each of the filter sets corresponds to a single color;
    splitting the image-sensor data into a second pre-determined number of images, each image corresponding to a portion of the image-sensor data associated with one of the filter sets;
    compressing each of the images using an image compression algorithm; and
    sending the compressed images to a second computing device, wherein the second computing device is configured to create an output image based on the compressed images wherein creating the output image comprises:
        de-compressing each of the received compressed images;
        generating an interleaved image data by interleaving the de-compressed images; and
        generating the output image by de-mosaicing the interleaved image data.

2. The method of claim 1, wherein the image sensor converts light information into electrical data for each pixel.

3. The method of claim 1, wherein a filter belonging to one of the filter sets passes light information for a corresponding color, wherein each pixel in the image sensor is associated with a filter, and wherein the filter sets in the color filter array are arranged in a pre-determined pattern.

4. The method of claim 3, wherein each of the images comprises data associated with pixels filtered by filters of a corresponding filter set.

5. The method of claim 1, wherein the first pre-determined number is equal to the second pre-determined number.

6. The method of claim 1, wherein the color filter array is a Bayer filter array.

7. The method of claim 1, wherein the image compression algorithm is efficient with sparse data.

8. The method of claim 1, further comprising performing a noise reduction on each of the images.

9. The method of claim 1, wherein generating the output image comprises noise reduction, dynamic range correction, or interpolation.

10. One or more computer-readable non-transitory storage media embodying software that is operable on a first computing device associated with an image sensor when executed to:
    access image-sensor data generated by the image sensor, wherein the image sensor has a color filter array comprising a first pre-determined number of filter sets, and wherein each of the filter sets corresponds to a single color;
    split the image-sensor data into a second pre-determined number of images, each image corresponding to a portion of the image-sensor data associated with one of the sets of filters;
    compress each of the images using an image compression algorithm; and
    send the compressed images to a second computing device, wherein the second computing device is configured to create an output image based on the compressed images, wherein creating the output image comprises:
        de-compressing each of the received compressed images;
        generating an interleaved image data by interleaving the de-compressed images; and
        generating the output image by de-mosaicing the interleaved image data.

11. The media of claim 10, wherein the image sensor converts light information into electrical data for each pixel.

12. The media of claim 10, wherein a filter belonging to one of the filter sets passes light information for a corresponding color, wherein each pixel in the image sensor is associated with a filter, and wherein the filter sets in the color filter array are arranged in a pre-determined pattern.

13. The media of claim 12, wherein each of the images comprises data associated with pixels filtered by filters of a corresponding filter set.

14. The media of claim 10, wherein the first pre-determined number is equal to the second pre-determined number.

15. The media of claim 10, wherein the color filter array is a Bayer filter array.

16. The media of claim 10, wherein the image compression algorithm is efficient with sparse data.

17. The media of claim 10, wherein generating the output image comprises noise reduction, dynamic range correction, or interpolation.

18. A first computing device associated with an image sensor comprising:
    one or more processors; and
    one or more computer-readable non-transitory storage media coupled to one or more of the processors and comprising instructions operable when executed by one or more of the processors to cause the system to:
        access image-sensor data generated by the image sensor, wherein the image sensor has a color filter array comprising a first pre-determined number of filter sets, and wherein each of the filter sets corresponds to a single color;

split the image-sensor data into a second pre-determined number of images, each image corresponding to a portion of the image-sensor data associated with one of the sets of filters;

compress each of the images using an image compression algorithm; and send the compressed images to a second computing device, wherein the second computing device is configured to create an output image based on the compressed images wherein creating the output image comprises:

de-compressing each of the received compressed images;

generating an interleaved image data by interleaving the de-compressed images; and generating the output image by de-mosaicing the interleaved image data.

* * * * *